United States Patent
Takahashi et al.

[11] Patent Number: 6,096,405
[45] Date of Patent: *Aug. 1, 2000

[54] MAGNETIC RECORDING MEDIUM HAVING A GLASS SUBSTRATE AND METHOD OF MANUFACTURING THE MAGNETIC RECORDING MEDIUM

[75] Inventors: Kouichi Takahashi; Takeshi Kojima; Takemi Miyamoto, all of Yamanashi, Japan

[73] Assignee: Hoya Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/941,296

[22] Filed: Sep. 30, 1997

[30] Foreign Application Priority Data

Sep. 30, 1996 [JP] Japan .................................... 8-280153
Sep. 30, 1996 [JP] Japan .................................... 8-280154

[51] Int. Cl.[7] ..................................................... G11B 5/82
[52] U.S. Cl. ........................ 428/141; 428/65.3; 428/66.7; 428/694 ST; 428/694 SG; 428/900
[58] Field of Search ..................................... 428/141, 65.3, 428/66.7, 694 ST, 694 SG, 900, 426, 432

[56] References Cited

U.S. PATENT DOCUMENTS

| | | | |
|---|---|---|---|
| 5,080,948 | 1/1992 | Morita et al. ............................ | 428/64 |
| 5,128,922 | 7/1992 | Inui et al. ................................ | 369/280 |
| 5,341,606 | 8/1994 | Hirabayashi .......................... | 51/283 R |
| 5,470,694 | 11/1995 | Ohta et al. ............................... | 430/321 |

FOREIGN PATENT DOCUMENTS 0105374  4/1984  European Pat. Off. .

Primary Examiner—Stevan A. Resan
Attorney, Agent, or Firm—Sughrue, Mion, Zinn, Macpeak & Seas, PLLC

[57] ABSTRACT

In a glass substrate for use in a magnetic recording medium, the glass substrate has a pair of principal surfaces opposite to each other and a peripheral side area contiguous to the principal surfaces. The peripheral side area has a side end wall and intermediate regions between the side end wall and the principal surfaces. In this case, at least one of the intermediate regions and the side end wall is formed by a mirror finished surface which has a surface roughness Ra not greater than 1 μm or a surface roughness Rmax not greater than 4 μm. With this structure, no particles are generated from the peripheral side area because the side end surface of the glass substrate is mirror finished. Consequently, reproduction is performed without reproduction errors because of no generation of a thermal asperity and a head crash can be sufficiently avoided because of no projections which might result from the particles.

23 Claims, 2 Drawing Sheets

MAGNETIC RECORDING MEDIUM HAVING A GLASS SUBSTRATE AND METHOD OF MANUFACTURING THE MAGNETIC RECORDING MEDIUM

BACKGROUND OF THE INVENTION

This invention relates to a magnetic recording medium used for a computer and the like.

Heretofore, an aluminum substrate has been widely used for a magnetic recording medium, such as a magnetic disk. However, the aluminum substrate has been gradually replaced by a glass substrate which is advantageous in strength and flatness as compared with the aluminum substrate.

On the other hand, a thin-film head has been widely used as a magnetic head. However, the thin-film head tends to be recently replaced by a magneto-resistive head (MR head) and a giant magneto-resistive head (GMR head). Therefore, development would be directed to a magnetic recording medium which can be matched with the magneto-resistive head. Such a magnetic recording medium often has a glass substrate.

However, reproduction errors very often occur and a reproduction becomes more difficult as a flying height becomes lower when the magneto-resistive head runs along the magnetic recording medium of the glass substrate.

SUMMARY OF THE INVENTION

It is an object of this invention to provide a magnetic recording medium which is capable of reducing a reproduction error even if a flying height of a magnetic head becomes low.

As mentioned above, the reproduction error often occurs when the flying height of the magnetic head becomes low. Therefore, close investigation has been carried out about the cause of the reproduction error. According to the inventors' experimental studies, it is found out that particles are attached on a principal surface of a glass substrate and projections are formed due to the particles on the magnetic recording medium. Such projections bring about a thermal asperity which causes the magneto-resistive head to generate heat. As a result, a resistivity of the head is fluctuated and thereby, an adverse influence is given to electro-magnetic conversion.

Further, the thermal asperity is often generated for the magnetic disk after a glide test for checking a head crash. In this case, various particles bring about the thermal asperity. For example, such particles may include a particle which gives an adverse influence when the head is afloat. Such a particle comprises an angular or irregular configuration.

Subsequently, the cause that the particles are attached to the conventional glass substrate has been investigated. As a result of the investigation, it is found out that the particles generated from a side end surface of the glass substrate are attached to the principal surface of the glass substrate. This is because the end side surface is rough as compared with a principal surface of the glass substrate. Specifically, when the glass substrate is got in and out of a housing of a material such as a polycarbonate, the side end surface of the glass substrate is inevitably contacted with an internal surface of the housing. Such contacts of the side end surface with the housing give rise to generation of the particles and the generated particles are attached on the principal surface of the glass substrate.

Conventionally, an attention has been generally paid for the side end surface only from the viewpoint of a mechanical strength of the glass substrate. In contrast, an attention is paid in U.S. Pat. No. 5,569,518 for avoiding generation of the particles by chemically etching or polishing the side end surface into a chemical polished surface. It is known in the art that such a chemical polished surface is rough and exhibits a mat (or dull) finished surface. As a result, it has been confirmed that the side end surface must be precisely polished by mechanical polishing to avoid generation of the particles. Conventionally, the side end surface is processed by chemical etching. However, the chemical etching process is not enough to suppress generation of the particles.

Herein, it is assumed that a magnetic recording medium which is manufactured by the use of the glass substrate is shaped in a disk which has an inner periphery and an outer periphery. In this event, the inner and the outer peripheries are irregularly etched, which might result in deviation of an axis.

On the other hand, the present invention points out that generation of particles can be prevented by mechanically polishing the side surface into a mirror finished surface without any deviation of an axis in a magnetic recording medium.

Specifically, according to this invention, the glass substrate has a pair of principal surfaces opposite to each other and a peripheral side area contiguous to the principal surfaces. The peripheral side area has a side end wall and intermediate regions between the side end wall and the principal surfaces. In this case, at least one of the intermediate regions and the side end wall is formed by a mirror finished surface which has a surface roughness Ra not greater than 1 $\mu$m or a surface roughness Rmax not greater 4 $\mu$m.

In this invention, no particles are generated because the side end surface of the glass substrate is mirror finished. Consequently, reproducing function is not reduced by the thermal asperity. Further, a head crash can be sufficiently prevented since no projections are formed due the particles on the magnetic recording medium.

DESCRIPTION OF THE PREFERRED EMBODIMENT

Figure 1:
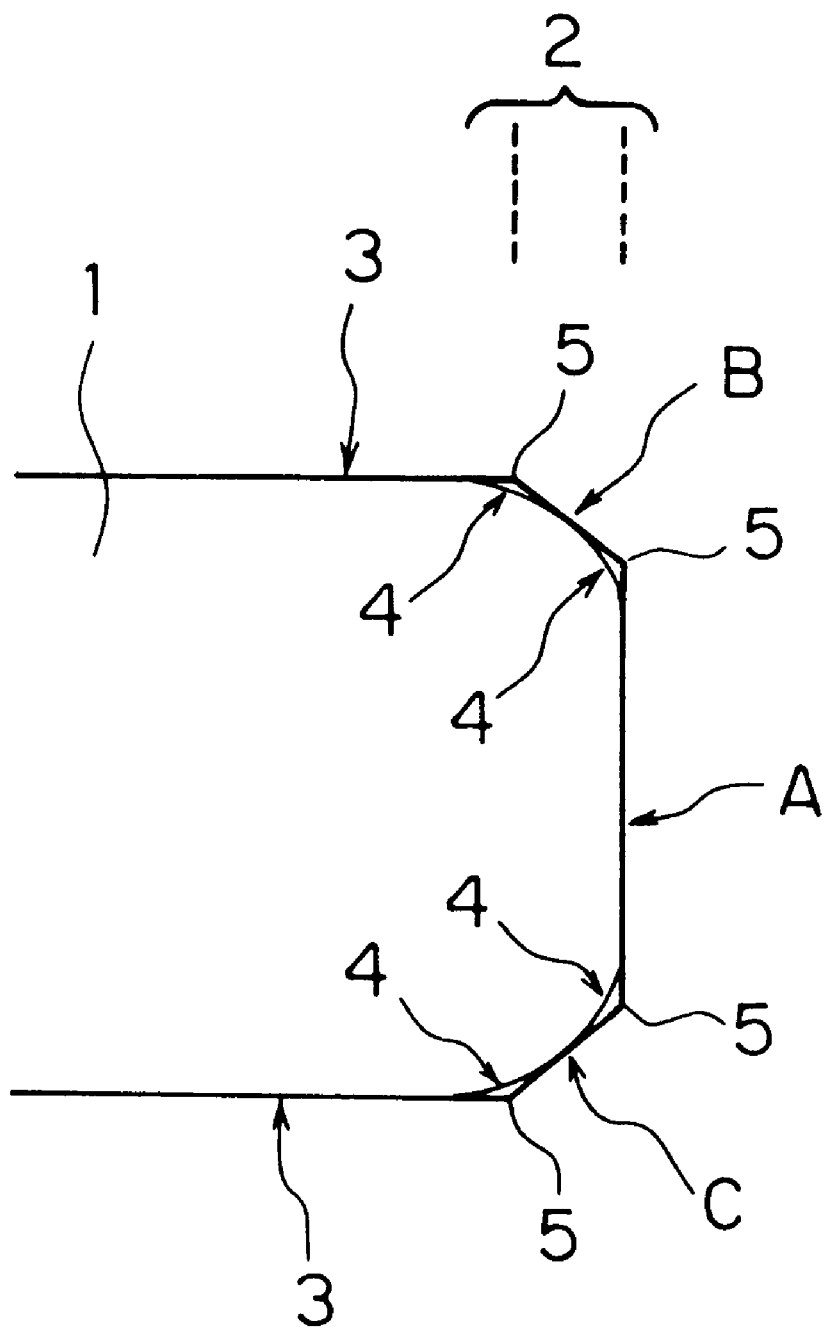
FIG. 1 shows a cross sectional view of a part of a glass substrate.

Referring to FIG. 1, description will be made about a glass substrate 1 of this invention.

The glass substrate 1 has an end portion in section, as illustrated in FIG. 1. In FIG. 1, the glass substrate 1 has principal surfaces 3 opposite to each other and a peripheral side area 2 contiguous to the principal surfaces 3. The peripheral side area 2 has a side end wall A and intermediate regions B and C between the side end wall A and each of the principal surfaces 3.

In the illustrated example, each of intermediate regions B and C is intentionally chamfered into a chamfered portion by a chamfering process, as will later be discussed. However, the intermediate regions B and C may be unintentionally chamfered during a grinding or a polishing process, as will later be discussed also. Herein, it is to be noted that the side end wall A and the intermediate regions B and C are all mirror finished by mechanical polishing and therefore have mechanical polished surfaces specified by a surface roughness Ra which is not greater than 1 μm, where Ra is representative of the center-line mean roughness (defined in Japanese Industrial Standard JIS B 0601). The mechanical polished surfaces will also be called mirror finished surfaces hereinunder because they are subjected to a mirror finished process. However, such a mirror finished surface may be formed on at least one of the side end wall A and the intermediate regions B and C. In this event, the surface roughness Ra falls preferably in the range of 0.001 to 0.8 μm, and more preferably, in the range of 0.001 to 0.5 μm.

Alternatively, the mirror finished surface may be represented by a surface roughness Rmax, where Rmax is defined as a maximum height representative of a difference between a highest point and a lowest point, instead of Ra. In this event, the surface roughness Rmax may be not greater than 4 μm. Preferably, the maximum height Rmax falls within the range between 0.01 and 2 μm, and more preferably, within the range between 0.01 and 1 μm.

Thus, the glass substrate 1 according to this invention has the mirror finished surfaces each of which is specified by the surface roughness Ra not greater than 1 μm or the surface roughness Rmax not greater than 4 μm. Under the circumstances, it has been confirmed that no projections are generated on the principal surfaces 3, resulting from the surface roughness of the side end wall A and the intermediate regions B and C of the glass substrate 1. Consequently, it has been found out that no thermal asperity is generated.

Further, rounded surfaces 4 are formed between each of the principal surfaces 3 and each of the intermediate regions B and C. In addition, rounded surfaces 4 are formed between each of the intermediate regions B and C and the side end wall A. Each rounded surface 4 has a radius between 0.2 and 10 mm, preferably between 0.2 and 2 mm, and more preferably between 0.2 and 1 mm. Generation of the particles can completely be prevented by forming the rounded surfaces 4. Specifically, if angular surfaces 5 are formed between each of the principal surfaces 3 and each of the intermediate regions B and C or between each of the intermediate regions B and C and the side end wall A, the angular surfaces 5 might generate the particles when they are contacted with the housing. Therefore, according to this invention, the rounded surfaces 4 are formed by mechanically polishing the angular surfaces 5 to avoid generation of the particles. The rounded surface 4 has preferably the surface roughness Rmax of 0.01–2 μm and the surface roughness Ra of 0.001–1 μm, more preferably, the surface roughness Rmax of 0.01–1 μm and the surface roughness Ra of 0.001–0.8 μm, and still more preferably, the surface roughness Rmax of 0.01–1 μm and the surface roughness Ra of 0.001–0.5 μm.

A mirror finish process is performed for the peripheral side area 2 of the glass substrate 1 to obtain the mirror finished surface as mentioned above. Specifically, the mirror finish process is carried out by mechanical polishing, such as brushing, buffing, polishing by the use of a polishing pad, such as a soft polisher and a hard polisher, and a solid or a liquid polishing substance, such as loose abrasives, bonded abrasives, slurry, and the like. At any rate, the mechanical polishing may be performed by combining mechanical polishing of different types and mechanical polishing carried out by the use of different polishers in grain size and types to obtain the mirror finished surface having the above-mentioned surface roughness. The mechanical polishing may be referred to as physical polishing or dynamical polishing.

For example, the soft polisher may include a suede, a velour, or the like, while the hard polisher may include hard velour, foamed urethane, pitch impregnated suede, or the like. Further, the abrasives may include, for example, cerium oxide ($CeO_2$), alumina ($\gamma-Al_2O_3$), red oxide ($Fe_2O_3$), chromium oxide ($Cr_2O_3$), zirconium oxide ($ZrO_2$), and titanium oxide ($TiO_2$).

In the illustrated example, the intermediate regions (chamfered portions) B and C are formed on both sides of the side end wall A. Thereafter, the mirror finish process is performed for the intermediate regions B and C. As a result, no particles are generated from the side end wall A and the intermediate regions B and C even if the glass substrate 1 contacts with a housing at the peripheral side area 2 when the glass substrate 1 is got in and out of the housing.

The mirror finish process due to the mechanical polishing for the peripheral side area 2 may be carried out after or before the principal surfaces 3 of the glass substrate 1 are lapped or polished. In general, the polishing or lapping process is divided into (1) a rough grinding step, (2) a lapping step, (3) a first polishing step, (4) a second polishing step. Taking the above into consideration, the above-mentioned mirror finish process may be performed after each of the steps (1), (2), (3), and (4). For example, the mirror finish process may be performed after the rough grinding step. Alternatively, the mirror finish process may be performed after the lapping step, the first polishing step, or the second polishing step. Where the mirror finish process is performed before the lapping step, the peripheral side area 2 is often slightly rough by sands used in the lapping step.

In addition, it is preferable that the principal surface 3 of the glass substrate 1 has the surface roughness Ra not greater than 2 nm to prevent the thermal asperity.

No limitation is imposed as to a kind, a size and a thickness of the glass substrate 1 in this invention. The glass substrate 1 may be formed by glass or glass ceramics. In this case, the glass may be, for example, aluminosilicate glass, soda-lime glass, soda aluminosilicate glass, aluminoborosilicate glass, borosilicate glass, silicate glass and chain silicate glass, while the glass ceramics may be, for example, crystallized glass. By way of example, the aluminosilicate glass is exemplified and may contain, by weight, 62–75% of $SiO_2$, 5–15% of $Al_2O_3$, 4–10% of $Li_2O$, 4–12% of $Na_2O$, 5–15% of $ZrO_2$ as main components. In addition, the glass includes a weight ratio of $Na_2O/ZrO_2$ which falls within a range between 0.5 and 2.0 and a weight ratio of $Al_2O_3/ZrO_2$ which falls within a range between 0.4 and 2.5 so as to chemically reinforce the glass substrate. Further, such chemically reinforced glass preferably contains, by mol %, 57–74% of $SiO_2$, 0–2.8% of $ZnO_2$, 3–15% of $Al_2O_3$, 7–16% of $LiO_2$ and 4–14% of $Na_2O$ so as to remove projections on the principal surfaces 3 which results from insoluble substances of $ZrO_2$. The chemically reinforced aluminosilicate glass which has the above-mentioned composition is excellent in transverse bending strength and Knoop hardness. In addition, such a glass has a compressive stress layer deep enough.

In this embodiment, the chemical reinforcement can be made by performing an ion exchange method at a low temperature for the glass substrate 1 to improve properties against impact and vibration. Instead, the known chemical reinforcement can be used to chemically reinforce the glass substrate 1. However, the ion exchange method is preferable as compared with the latter method from the viewpoint of a glass transition point because the former is carried out at a temperature less than the glass transition point. A fused salt used for the chemical reinforcement includes a potassium nitrate, a sodium nitrate, a nitrate mixed with them. The glass substrate 1 according to this invention is also used not only for a magnetic recording medium but also a photomagnetic disk and an electro-optical disk, such as a photo disk. Especially, the glass substrate is effective to the photomagnetic disk which is seriously influenced by particles attached thereto.

Subsequently, description will be made about a magnetic recording medium mentioned above.

Herein, such a magnetic recording medium has at least one magnetic layer formed on the glass substrate 1 as well known in the art. In this invention, no particles are generated from the side end wall A and the intermediate regions B and C because the side end wall A and the intermediate regions B and C are subjected to the mirror finish process, as mentioned above. This shows that no projections are left on the magnetic layer due to generation of the particles, even when the magnetic layer is formed on the glass substrate 1. Consequently, the head crash can be sufficiently prevented when the reproduction is performed by the magneto-resistive (MR) head. Further, no reproduction error occurs because no defect due to the particle remains on the magnetic layer.

Specifically, the magnetic recording medium is formed by successively depositing an underlying layer, a magnetic layer, a protection layer and a lubricating layer on the glass substrate 1 which has the desired flatness and surface roughness as mentioned above and which is subjected to chemical reinforcement.

The underlying layer is selected in relation to the magnetic layer. At least one metal selected from a group consisting of nonmagnetic metals, Cr, Mo, Ta, Ti, W, V, B, Al may be used as a material of the underlying layer. The metal Cr or the Cr alloy is preferably used as the material of the underlying layer to enhance a magnetic characteristic where the magnetic layer includes Co as a main component. In addition, the underlying layer may not always be formed by a single layer but may be formed by a multi-layer composed of a plurality of identical or different layers. For example, deposition may be made as the underlying layer formed by the multi-layer such as Cr/Cr, Cr/CrMo, Cr/CrV, CrV/CrV, Al/Cr/CrMo, Al/Cr/Cr, Al/Cr/CrV, and Al/CrV/CrV.

In this invention, no limitations are imposed as to the magnetic layer also.

The magnetic layer may be, for example, a layer which contains Co as a main component and which has a composition selected from CoPt, CoCr, CoNi, CoNiCr, CoCrTa, CoPtCr, CoNiPt, CoNiCrPt, CoNiCrTa, CoCrTaPt, and CoCrPtSiO. In addition, the magnetic layer has a multi-layer structure (for example, CoPtCr/CrMo/CoPtCr, CoCrTaPt/CrMo/CoCrTaPt). Such a structure is obtained by dividing a magnetic film by a nonmagnetic film (for example, Cr, CrMo, CrV) to reduce a noise, as known in the art. The magnetic layer for the magneto-resistive head (MR head) or the giant magneto-resistive head (GMR head) contains impurity elements selected from a group consisting of Y, Si, rare-earth elements, Hf, Ge, Sn and Zn, oxides of these impurity elements in addition to the Co-based alloy.

Further, the magnetic layer may have a granular structure wherein magnetic grains, such as Fe, Co, FeCo and CoNiPt, are dispersed in the nonmagnetic film comprising a ferrite-based material, an iron-rare earth-based material, $SiO_2$, and BN. Further, the magnetic layer may have a recording form of either an in-plane magnetization type or a perpendicular magnetization type.

No restrictions are imposed as to the protection layer also according to this invention. Specifically, the protection layer may be formed by a chromium film, a chromium alloy film, a carbon film, a zirconia film and a silica film and may be successively deposited on the glass substrate 1 together with the underlying layer and the magnetic layer by the use of the known in-line sputtering apparatus. The protection layer may be formed by a single layer or a multi-layer including a plurality of layers of an identical material or different materials.

In addition, the other protection layer, such as a $SiO_2$ film, may be used instead of the above protection layer. Such a $SiO_2$ film may be formed on the chromium film by dispersing colloidal silica fine grains in tetraalkoxysilane diluted with an alcohol-based solvent and thereafter by coating and baking the dispersed grains.

Moreover, the lubricating layer is not restricted to the above. For example, the lubricating layer is formed by diluting perfluoropolyether (PFPE) with a solvent, such as freon-based solvent, and applying it on the medium surface by a dipping method, a spin coating method, or a spraying method, and firing the medium.

FIRST EXAMPLE (1) Roughing step by grinding and polishing

First, a sheet glass of aluminosilicate is formed by a down draw method and is cut by a grinding wheel into a disc-shaped glass substrate which has a diameter of 96 mm and a thickness of 3 mm. The glass substrate is lapped or polished to a diameter of 96 mm and a thickness of 1.5 mm by a relatively rough diamond grindstone. In this case, the disc-shaped glass substrate may be formed by directly pressing a melting glass with a cope, a drag and a drum instead of the down draw method.

In this event, the above-mentioned glass which is chemically reinforced contains, by mol %, 57–74% of $SiO_2$, 0–2.8% of $ZnO_2$, 3–15% of $AL_2O_3$, 7–16% of $LiO_2$, and 4–14% of $NaO_2$ as main components. Further, the chemically reinforced glass contains, by weight, 63% of $Sio_2$, 14% of $Al_2O_3$, 6% of $Li_2O$, and 10% of $Na_2O$ as main components. The above-mentioned composition can be expressed in terms of a mol representation and comprises, by mol %, 67% of $SiO_2$, 1.0% of $ZnO_2$, 9.0% of $Al_2O_3$, 12.0% of $LiO_2$ and 10.0% of $NaO_2$.

Subsequently, the both principal surfaces 3 of the glass substrate 1 are ground or lapped by a diamond grindstone having grains smaller than those of the above grindstone. In this case, a load was set to the extent of 100 Kg. Thereby, the principal surface 3 of the glass substrate 1 was ground into a surface roughness Rmax (JIS B 0601)of about 10 μm.

Next, an opening was formed at a center portion of the glass substrate 1 by using the cylindrical grindstone. Further, the outer side end surface is ground to a diameter of 95 mm. Thereafter, the outer and inner side end surfaces were chamfered. In this case, the side end wall A of the glass substrate 1 had a surface roughness Rmax of about 14 μm.

(2) Mirror finishing step of the side end surface

The internal and outer side walls of the glass substrate 1 were polished by the use of a brush and loose abrasives by rotating the glass substrate 1 so that the both side end walls had the surface roughness Rmax of about 1 μm and the surface roughness Ra of about 0.3 μm. Next, the glass substrate 1 was washed with water after the mirror finish process of the side end walls.

(3) Lapping step

The lapping step was performed for the glass substrate 1 to improve dimension and shape accuracy. The lapping step is carried out by using a lapping apparatus. In this case, the lapping step is conducted two times by changing grain degrees from #400 to #1000. Specifically, the lapping was performed for the both principal surfaces 3 of the glass substrate 1 so that the principal surfaces 3 had a surface accuracy of 0–1 μm and the surface roughness Rmax of about 6 μm. In this event, the lapping was carried out by rotating an inner gear and an outer gear by the use of alumina grains having a grain degree of #400 on the condition that the load L was kept at about 100 Kg. Next, the lapping is performed by changing the grain degree of the alumina grain into #1000. As a result, the surface roughness Rmax becomes about 2 μm. Subsequently, the glass substrate 1 was immersed in washing units by using natural detergent and water to be washed.

(4) First polishing step

Next, first polishing was performed by a polishing apparatus to remove a defect and a distortion remaining in the above lapping process. Specifically, a hard polisher (which may be a cerium impregnated foamed urethane pad, such as MHC15 made by Speedfam) was used as a polisher and the first polishing was performed the following polishing condition.

Polishing liquid: oxide cerium+water

Load: 300 g/cm$^2$ (L=238 kg)

Polishing time: 15 minutes

Removing amount: 30 μm

Revolution of lower surface plate: 40 rpm

Revolution of upper surface plate: 25 rpm

Revolution of inner gear: 14 rpm

Revolution of outer gear: 29 rpm

The glass substrate 1 was washed by being successively dipped in washing units of natural detergent, pure water, IPA (isopropyl alcohol), IPA (vapor drying) after the first polishing.

(5) Second polishing step

Next, second polishing was conducted by changing the above hard polisher into a soft polisher (which may be a polishing pad of a suede type, such as Polylax made by Speedfam) by using the polishing apparatus used in the first polishing process. The polishing condition is similar to the first polishing step except for the load of 100 g/cm$^2$, the polishing time of 5 minutes and the removing amount of 5 μm. The glass substrate 1 was immersed in washing units of the natural detergent, the pure water, the IPA (isopropyl alcohol), the IPA (vapor drying) to be washed therein after the second polishing step. In this case, a supersonic wave was applied to each of the washing units.

(6) Chemical reinforcing step

Next, a chemical reinforcing step was performed for the glass substrate 1 after the polishing step was completed. First, a chemical reinforcing solution was prepared by mixing potassium nitrate (60%) with sodium nitrate (40%). The chemical reinforcing solution was heated up to 400° C. The glass substrate 1 which was washed and preheated to 300° C. was dipped in the chemical reinforcing solution for 3 hours. The chemical reinforcing step was carried out so that the entire surface of the glass substrate 1 was chemically reinforced with a plurality of glass substrates retained at the end surface in a holder. Under the circumstances, lithium ions and sodium ions on a surface layer of the glass substrate 1 were replaced by sodium ions and potassium ions in the chemical reinforcing solution by dipping each glass substrate 1 in the the chemical reinforcing solution. Thus, the glass substrate 1 is chemically reinforced. A compressive stress layer formed in the surface layer of the glass substrate 1 had a thickness of about 100–200 μm. Next, the chemically reinforced glass substrate 1 was dipped in a water tank of 20° C., quickly cooled and retained for 10 minutes. Subsequently, the cooled glass substrate 1 was dipped in a sulfuric acid heated up to 40° C., and was washed by the supersonic wave. The surface roughness (Ra, Rmax) of the peripheral side area 2 of the glass substrate 1 at the intermediate region (chamfered portion) B (length: 0.15 mm), the intermediate region (chamfered portion) C (length: 0.15 mm) and the side end wall A (length: 0.35 mm) are shown in Table 1. In Table 1, the surface roughness Ra of the intermediate region B is 0.2 μm, while the surface roughness Rmax of the intermediate region B is 1.9 μm. Further, the surface roughness Ra of the intermediate region C is 0.15 μm, while the surface roughness Rmax of the intermediate region C is 2.9 μm. In addition, the surface roughness Ra of the side end wall A is 0.35 μm, while the surface roughness Rmax of the side end wall A is 3.4 μm. Also, the principal surface 3 of the glass substrate 1 has the surface roughness Ra of 0.5–1 nm. In addition, the surface of the glass substrate 1 is precisely tested. As a result of the test, no particles which are the cause of the thermal asperity exist on the principal surface 3.

TABLE 1

|  | Ra (μm) | Rmax (μm) |
| --- | --- | --- |
| Side End Wall A | 0.35 | 3.4 |
| Intermediate Region B | 0.2 | 1.9 |
| Intermediate Region C | 0.15 | 2.9 |

Measuring Length: 0.8 mm

In addition, it is to be noted that the side end wall A is 0.45 mm thick when the glass substrate has a diameter of 3.5 inches. In this case, similar result has been confirmed.

(7) Magnetic disc manufacturing step

A texture layer, a CrN underlying layer, a CrMo underlying layer, a CoPtCrTa magnetic layer and a C protection layer were successively deposited on the both principal surfaces 3 of the glass substrate 1 by using the known in-line sputtering apparatus to obtain a magnetic disk. Next, a glide test was performed in connection with the obtained magnetic disk. As a result of the test, no hit and crash occur. In this case, the hit means that the magnetic head touches projections on the surface of the magnetic disk, and the crash means that the magnetic head collides with the projections on the surface. Further, it is confirmed that no defects due to the particles are generated on the magnetic layer.

Also, the glide test was performed for the first example wherein the peripheral side area 2 of the glass substrate 1 was mirror finished, a first comparative example wherein the peripheral side area end 2 was etched, and a second comparative example wherein neither polishing nor etching was performed. The test result is shown in Table 2 as a result of the glide test. Concretely, the yield of the first example was 95% or more. In contrast, the yield of each of the first and second comparative examples was 85%. From Table 2, it is understood the first example is superior to the first and the second examples. Thus, the conventional method of etching the peripheral side area of the glass substrate can not accomplish the object of this invention.

TABLE 2

|  | 1st Example | 1st Comparative Example | 2nd Comparative Example |
| --- | --- | --- | --- |
| Yield of Glide Test | 90% or more | 87% or less | 87% or less |

In addition, a reproduction test was performed for the magnetic disk after the glide test. As a result of the test, it has been confirmed that no reproduction errors due to the thermal asperity take place in connection with the samples (500 samples) according to this invention.

SECOND AND THIRD EXAMPLES

Second and third examples are similar to the first example except that soda-lime glass (the second example) and soda aluminosilicate glass (the third example) are replaced by the aluminosilicate glass of the first example. As a result, the outer and inner side end surfaces of the glass substrate 1 have the surface roughness Rmax of 1.5 μm in case of soda-lime glass (the second example). Although the soda-lime glass substrate had a slightly rough surface as compared with the aluminosilicate glass, no practical problem accrued in such a glass substrate.

FOURTH EXAMPLE

An underlying layer of Al (50 Å)/Cr (1000 Å)/CrMo (100 Å), a magnetic layer of CoPtCr (120 Å)/CrMo (50 Å)/CoPtCr (120 Å) and a Cr (50 Å) protection layer are successively deposited on the both principal surfaces 3 of the glass substrate 1 obtained in the first example by the known in-line sputtering apparatus. The above substrate is dipped in an organosilicon compound solution (mixed liquid with water, IPA and tetraethoxy silane) wherein silica fine grains (grain diameter of 100 Å) are dispersed. Next, the protection layer of $SiO_2$ textured was formed by baking. Further, the protection layer was subjected to a dipping process within a lubricating agent of perfluoropolyether to obtain the magnetic disk for the MR head.

The glide test was carried out for the obtained magnetic disk. As a result of the test, neither hit nor crash occur. Further, it has been confirmed that no defect was formed on the magnetic layer. In addition, no reproduction errors due to the thermal asperity were generated as a result of reproduction test.

FIFTH EXAMPLE

A fifth example is similar to the fourth example except that Al/Cr/Cr was used as the underlying layer and CoNi-CrTa is used as the magnetic layer. It has been confirmed that a magnetic disk like in the fourth example was obtained in the fifth example also.

Figure 2:
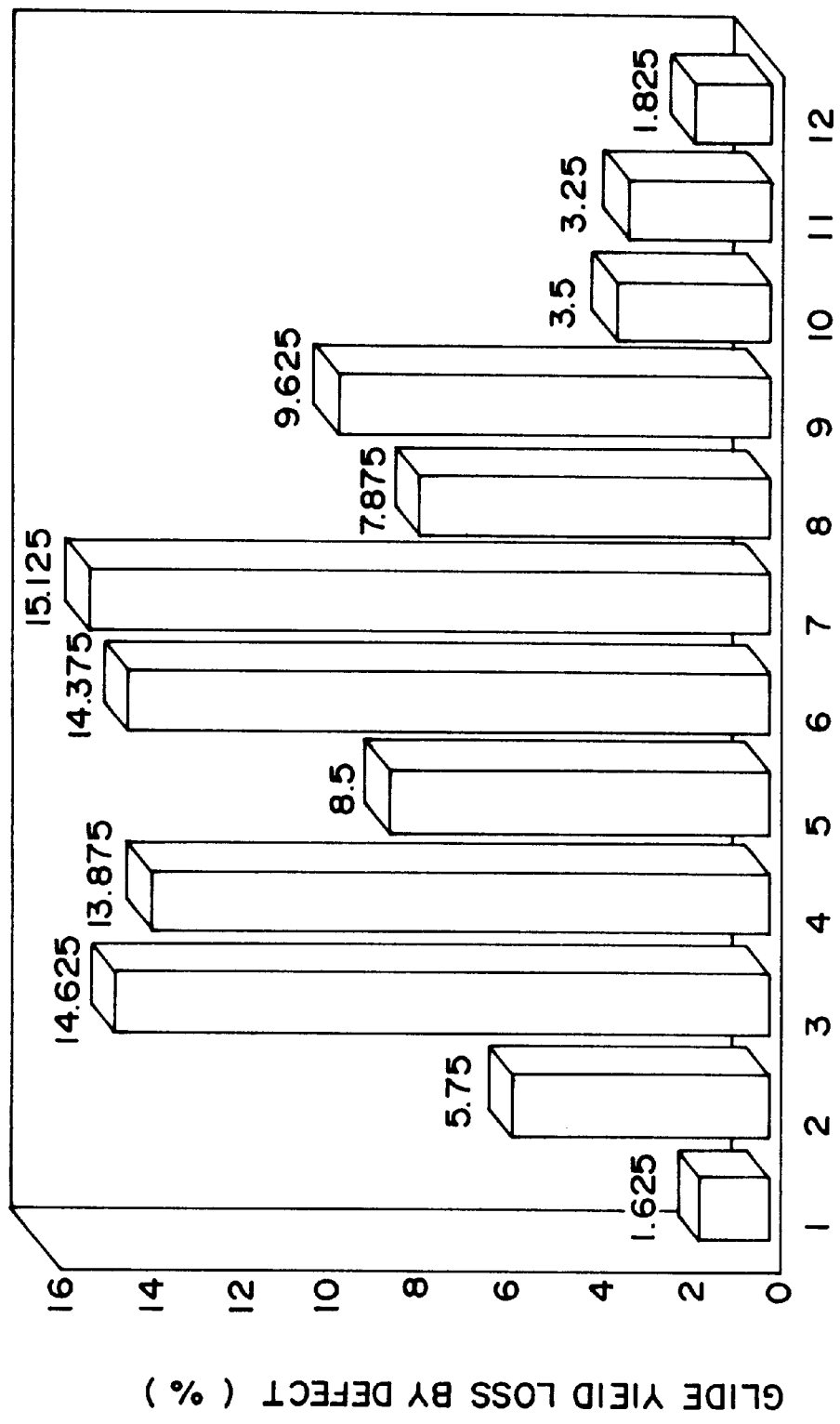
FIG. 2 shows a graphical representation for use in illustrating results of glide yield losses of various samples to specify the samples according to this invention.

Referring to FIG. 2, the glide test has been performed in connection with first through twelfth samples 1 to 12 with flying heights kept within a range between 1.1 and 1.3 (microinches). Herein, one hundred glass substrates have been prepared as each of the first through the twelfth samples 1 to 12. It is to be noted that the first, the second, the fifth, the eighth, the ninth, the tenth, the eleventh, and the twelfth samples 1, 2, 5, 8, 9, 10, 11, and 12 had the surface roughnesses Ra and Rmax defined by this invention while the third, the fourth, the sixth, and the seventh samples 3, 4, 6, and 7 had the surface roughnesses Ra and Rmax falling outside this invention, when each of the surface roughnesses Ra and Rmax is represented by an average value of the one hundred glass substrates. More specifically, the first, the second, the fifth, the eighth, the ninth, the tenth, the eleventh, and the twelfth samples 1, 2, 5, 8, 10, 11, and 12 had the surface roughnesses Ra and Rmax which are equal to 0.03 and 0.44; 0.18 and 1.80; 0.06 and 3.25; 0.53 and 2.50; 0.71 and 3.56; 0.09 and 0.98; 0.06 and 0.85; and 0.05 and 0.50 μm, respectively. On the other hand, the third, the fourth, the sixth, and the seventh samples had the surface roughnesses Ra and Rmax which are equal to 1.88 and 10.05; 1.53 and 7.45; 1.72 and 8.23; and 2.01 and 11.75 μm, respectively, and mat finished surfaces.

Under the circumstances, glide yield losses were measured during the glide test mentioned above by counting defects on each of the first through the twelfth samples 1 to 12 and were represented by (%), as shown by histograms in FIG. 2. The first, the second, the fifth, the eighth, the ninth, the tenth, the eleventh, and the twelfth samples 1, 2, 5, 8, 10, 11, and 12 according to this invention exhibited the glide yield losses of 1.625, 5.75, 8.5, 7.895, 9.625, 3.5, 3.25, and 1.825%, respectively, while the third, the fourth, the sixth, and the seventh samples 3, 4, 6, and 7 exhibited the glide yield losses of 14.625, 13.875, 14.375, and 15.125%, respectively. At any rate, the samples according to this invention exhibited the glide yield losses smaller than 10%.

In order to measure defects on a magnetic recording medium, various tests have been usually carried out by the use of a magneto-resistive (MR) head kept at a flying height of 50 nm and a rotation speed of 7 m/sec and may be collectively called a certification test. Actually, the certification test includes a positive modulation test, a negative modulation test, a missing test, an extra test, and a spike test, all of which are known in the art. Such tests also serve to evaluate the thermal asperity of each magnetic recording medium. Herein, each of the missing test, the spike test, and the extra test is helpful to classify the defects into a correctable defect, an uncorrectable defect, and a long defect.

Prior to each test, provision has been made about twenty-five of the magnetic recording media which have been polished in the above-mentioned manner, together with twenty-five unpolished magnetic recording media. Results of the above-mentioned tests have been averaged and summed up about the polished and the unpolished magnetic recording media. Under the circumstances, it has been found out that an average sum value of defects on each surface of the polished magnetic recording media has been equal in number to 9.56 while the average sum value of defects on each surface of the unpolished magnetic recording media has been equal in number to 16.4. In comparison with both the average sum values, it has been readily understood that a reduction rate of the defects in the polished magnetic recording media has been equal to 41.70%. This shows that the polished magnetic recording media according to this invention are remarkably improved in thermal asperity, as compared with the unpolished magnetic recording media.

While this invention has thus far been described in conjunction with several examples thereof, it will readily be possible for those skilled in the art to put this invention into practice in various other manners. For example, the mechanical polished surface, namely, the mirror finished surface may be formed on at least one of the inner and the outer peripheral surfaces of the magnetic recording medium.

What is claimed is:

1. A magnetic recording medium having a glass substrate and being operable in cooperation with a magneto-resistive head, said glass substrate having a pair of principal surfaces opposite to each other and a peripheral side area contiguous to the principal surfaces, the peripheral side area having a side end wall and intermediate regions between the side end wall and the principal surfaces, the peripheral side area having a rougher surface than at least one of the principal surfaces, wherein:

at least one of the intermediate regions and the side end wall is formed by a mirror finished surface which has a surface roughness Ra not greater than 1 μm in order to substantially reduce formation of thermal asperity due to particles being generated from the peripheral side area, where Ra is representative of the center-line mean roughness.

2. A magnetic recording medium as claimed in claim 1, wherein:

the surface roughness Ra falls within the range between 0.001 and 0.8 μm.

3. A magnetic recording medium as claimed in claim 1, wherein:

the surface roughness Ra falls within the range of 0.001 and 0.5 μm.

4. A magnetic recording medium as claimed in claim 1, wherein:

at least one of said principal surfaces has the surface roughness Ra which is not greater than 2 nm.

5. A magnetic recording medium having a lass substrate and being operable in cooperation with a magneto-resistive head, said glass substrate having a pair of principal surfaces opposite to each other and a peripheral side area contiguous to the principal surfaces, the peripheral side area having a side end wall and intermediate regions between the side end wall and the principal surfaces, the peripheral side area having a rougher surface than at least one of the principal surfaces, wherein:

at least one of the intermediate regions and the side end wall is formed by a mirror finished surface which has a surface roughness Ra not greater than 1 μm in order to substantially reduce formation of the thermal asperity due to particles being generated from the peripheral side area, where Ra is representative of the center-line mean roughness, wherein:

the intermediate regions are chamfered so that rounded surfaces are formed between each of the principal surfaces and each of the intermediate regions, said rounded surfaces having a radius between 0.2 and 10 mm and a surface roughness Ra that is not greater than 1 μm.

6. A magnetic recording medium having a glass substrate and being operable in cooperation with a magneto-resistive head, said glass substrate having a pair of principal surfaces opposite to each other and a peripheral side area contiguous to the principal surfaces, the peripheral side area having a side end wall and intermediate regions between the side end wall and the principal surfaces, the peripheral side area having a rougher surface than at least one of the principal surfaces, wherein:

at least one of the intermediate regions and the side end wall is formed by a mirror finished surface which has a surface roughness Ra not greater than 1 μm in order to substantially reduce formation of the thermal asperity, due to particles being generated from the peripheral side area, where Ra is representative of the center-line mean roughness and, wherein:

each of the side end wall and the rounded surfaces has a surface roughness Ra that is not greater than 1 μm.

7. A magnetic recording medium as claimed in claim 1, wherein:

at least a magnetic layer is formed on the glass substrate.

8. A magnetic recording medium as claimed in claim 7, wherein:

magnetic layer includes Co and Pt.

9. A magnetic recording medium as claimed in claim 1, wherein:

the magneto-resistive head comprises a giant magneto-resistive head.

10. A magnetic recording medium having a glass substrate and being operable in cooperation with a magneto-resistive head, said glass substrate having a pair of principal surfaces opposite to each other and a peripheral side area contiguous to the principal surfaces, the peripheral side area having a side end wall and intermediate regions between the side end wall and the principal surfaces, the peripheral side area having a rougher surface than the principal surface, wherein:

at least one of the intermediate regions and the side end wall is formed by a mirror finished surface which has a surface roughness Rmax not greater than 3 μm in order to substantially reduce formation of the thermal asperity, due to particles being generated from the peripheral side area, where Rmax is representative of a difference between a maximum height and a minimum height.

11. A magnetic recording medium as claimed in claim 10, wherein:

the surface roughness Rmax falls within the range between 0.01 and 2 μm.

12. A magnetic recording medium as claimed in claim 10, wherein:

the surface roughness Rmax falls within the range of 0.01 and 1 μm.

13. A magnetic recording medium as claimed in claim 10, wherein:

the intermediate regions are chamfered so that rounded surfaces are formed between each of the principal surfaces and each of the intermediate regions, the rounded surfaces having a radius between 0.2 and 10 mm.

14. A magnetic recording medium glass as claimed in claim 10, wherein:

each of the side end wall and the rounded surfaces has the surface roughness Rmax is not greater than 1 μm.

15. A magnetic recording medium as claimed in claim 10, wherein:

at least one of the intermediate regions and the side end wall also has a surface roughness Ra not greater than 1 μm, where Ra being representative of the center-line mean roughness.

16. A magnetic recording medium as claimed in claim 15, wherein:

the surface roughness Ra falls within the range between 0.001 and 0.8 μm.

17. A magnetic recording medium as claimed in claim 15, wherein:

the surface roughness Ra falls within the range between 0.001 and 0.5 μm.

18. A magnetic recording medium as claimed in claim 17, wherein:

each of the principal surfaces has the surface roughness Ra not greater than 2 nm.

19. A method of manufacturing a magnetic recording medium including a glass substrate having a pair of principal surfaces and a side end surface and being operable in cooperation with a magneto-resistive head, the side end surface being a rougher surface than the principal surface, comprising the step of:

forming a side end wall and intermediate regions on the side end surface, said intermediate region being positioned between the side end wall and the principal surfaces, polishing the glass substrate to provide a mirror finished surface on at least one of the intermediate regions and the side end wall in order to substantially prevent formation of thermal asperity due to particles being generated from the peripheral side area.

20. A method as claimed in claim 19, wherein:

the mirror finish surface is formed by mechanically polishing.

21. A method claimed in claim 19, further comprising the step:

chamfering the intermediate regions to provide rounded portions between the principal surface and the intermediate region.

22. A method as claimed in claim 21, wherein:

said rounded portions have a radius of 0.2–10 mm.

23. A method as claimed in claim 19, wherein:

the magneto-resistive head comprises a giant magneto-resistive head.

\* \* \* \* \*